United States Patent [19]

Stine

[11] 3,721,494

[45] March 20, 1973

[54] SLIDE CHANGER

[75] Inventor: Richard L. Stine, Cardiff-by-the-Sea, Calif.

[73] Assignee: Stromberg DatagraphiX, Inc., San Diego, Calif.

[22] Filed: Jan. 15, 1971

[21] Appl. No.: 106,829

[52] U.S. Cl. ................................................ 353/103
[51] Int. Cl. ............................................ G03b 23/00
[58] Field of Search .............. 353/103, 111, 114–118; 40/36, 79

[56] References Cited

UNITED STATES PATENTS

| | | | |
|---|---|---|---|
| 3,469,513 | 9/1969 | Hansen | 353/118 |
| 2,940,197 | 6/1960 | Jorgensen | 353/118 |
| 3,480,356 | 11/1969 | Dimitracopoulus | 353/118 |
| 3,044,198 | 7/1962 | Badalich | 40/79 |

*Primary Examiner*—Harry N. Haroian
*Assistant Examiner*—A. J. Mirabito
*Attorney*—John R. Duncan

[57] ABSTRACT

A slide changer especially adapted for handling forms slides in computer output microfilming equipment is disclosed. A magazine holds a plurality of slides in frictional engagement with substantially parallel grooves on inner magazine walls. An actuating bar adjacent to the magazine engages a selected slide to move the slide out of the magazine into a projection station. The actuating bar latches to the slide in a ball-and-socket manner as the slide is fully inserted into the projection station. After use, the bar moves the slide back into the magazine and automatically disengages from the slide. Each slide is provided with integral spring guide members formed in the slideframe along one edge, which comprise outwardly extending projections with slots parallel to the slide edge behind each projection. The magazine is movable in a direction perpendicular to the plane of the slides so that different slides may be selected.

8 Claims, 4 Drawing Figures

INVENTOR.
RICHARD L. STINE

SLIDE CHANGER

BACKGROUND OF THE INVENTION

Multiple-slide magazines from which individual slides may be easily selected for viewing or projection and equipment for handling the slides have come into widespread use. Most are designed for use with 35mm or similar color transparencies, and function with projectors which sequentially remove slides from the magazine, project them on a viewing screen and return them to the magazine.

Recently, computer output microfilming equipment has been developed in which alphanumeric or graphical information presented on the face of a cathode ray tube is photographed to produce microimages. This equipment operates at high speed and provides computer generated information in a convenient, easily handled and stored, arrangement. Often, it is desirable to print the text on the microfilm in a format which includes a background form, such as columns with headings and lines between columns. Forms projectors have been developed permitting a form image to be projected onto the film simultaneously with the photography of the tube face. However, it has been necessary to change the forms slides manually. This is undesirable, since an operator must interrupt the microfilm printer for a time sufficient for the manual change of forms slides. This requires an operator in constant attendance, besides decreasing machine throughput.

Slide changers of the type used in ordinary color transparency projectors cannot be conveniently adapted for use with such equipment. Such changers generally utilize a complex mechanical system for moving slides between magazine and projection stations. They are incapable of the exact positioning at the projection station required in systems requiring the superimposition of multiple images.

Present slide changers are incapable of effective random selection of slides from a magazine, since the usual changers handle slides in a fixed sequence. Also, many slide changing systems are incapable of handling the large, usually glass-mounted, slides used as form slides.

Thus, there is a continuing need for improved projection slide magazines and changers, especially for use with computer output microfilming equipment.

SUMMARY OF THE INVENTION

It is, therefore, an object of this invention to provide a slide handling system overcoming the above-noted problems.

Another object of this invention is to provide a slide changing system suitable for use with form slides in computer output microfilming system.

Another object of this invention is to provide a slide changing system of improved simplicity and reliability.

Still another object of this invention is to provide a slide changing system which locates slides at the projection station with uniformly high precision.

Yet another object of this invention is to provide a slide changing system which can quickly and precisely select any slide in a magazine and move it to the projection station.

The above objects, and others, are accomplished in accordance with this invention by a slide handling and changing system which includes a magazine for holding a plurality of slides, frames for each slide adapted to be carried by said magazine and a device for moving a selected slide from the magazine to a projection station. The slides are preferably held by friction in grooves in the magazine which is in the form of a bottomless rectangular housing. Each slide frame has a socket along the upper edge thereof. The slide moving device includes a bar which has an expanded end which engages the frame socket, so that the bar can push the slide downwardly from the magazine into a projection station, then lift the slide back into the magazine after use. Each slide is provided with integral spring guide members along one edge, which comprise outwardly extending projection with slots parallel to the slide edge behind each projection. The magazine is movable along a path extending between the slide moving device and the projection station, so that any slide can be brought into position by engagement by the slide moving device.

While the invention is described in this description of a preferred embodiment with the slide magazine above the projection station, other suitable arrangements may be used, if desired.

BRIEF DESCRIPTION OF THE DRAWING

Details of the invention, and of a preferred embodiment thereof, will be further understood upon reference to the drawing, wherein.

DETAILED DESCRIPTION OF THE INVENTION

Figure 1:
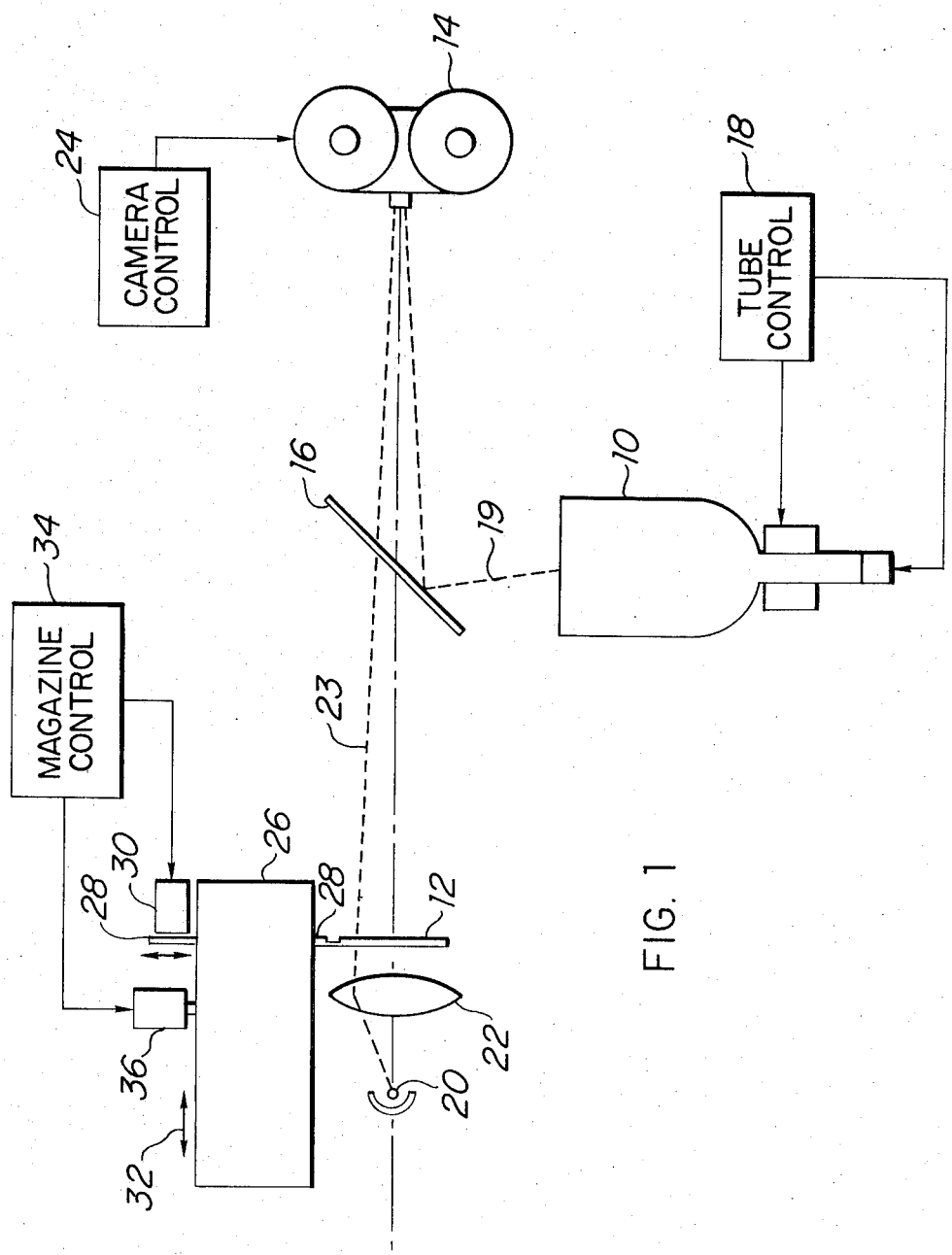
FIG. 1 is a schematic representation as seen from the side, of the overall system including the slide changing mechanism of this invention.

Referring now to FIG. 1 there is seen a schematic elevation of a computer-output microfilm recorder including the novel form slide changing system. In this recorder, information displayed on the face of a cathode ray tube and projected from form slide 12 are simultaneously photographed by camera 14. A partially-reflecting beam-splitter 16 serves to combine the images from tube 10 and slide 12 in register on the film in camera 14.

Alphanumeric information directly from a computer or from tape storage is displayed on the face of tube 10 under control of tube control means 18 and passes to the film along light paths illustrated by typical light ray 19. Any suitable system may be used for forming characters on the face of tube 10. Typically, the characters may be formed from dots or line strokes generated by tube control 18. An especially effective tube for this purpose is the shaped beam cathode ray tube, such as is described in U. S. Pat. No. 2,761,988 to McNaney.

Static information, such as a business form, is photographed simultaneously with the alphanumeric information from tube 10. The form is generally provided on form slide 18 as a transparent image on an opaque background. The form is projected to and imaged on the film in camera 14 by means of light source 20 and optical system 22, along the light path illustrated by typical light ray 23.

After a frame of film has been exposed to the form and the desired alphanumeric information, the film is advanced to the next exposure position under the control of camera control 24.

When it is desired to change the form, slide 12 is lifted from the projection station back into magazine 26 by a vertically movable rack bar 28 engaging a pinion gear driven by motor 30. Rack bar 28 extends downwardly through magazine 26 and connects to slide 12 by a ball-and-socket latching means described in detail below. When slide 12 is fully within magazine 26, rack bar 28 automatically disengages from slide 12. Magazine 26 is then moved in a direction perpendicular to the plane of the slides (as indicated by arrow 32) by a rack and pinion means driven by motor 36 until the desired slide to be used next is located directly below rack bar 28 which is now entirely above magazine 26. Magazine control 34 then activates motor 30 to move rack bar 28 downwardly to push the selected slide down into the projection station adjacent optical system 22.

As can be seen from this schematic illustration, the novel slide changing system permits rapid, simple selection and handling of form slides. While this slide changing system is especially useful in the overall system shown in FIG. 1, it could, of course, be used in other arrangements where it is desired to select and utilize slides in an irregular sequence.

Figure 2:
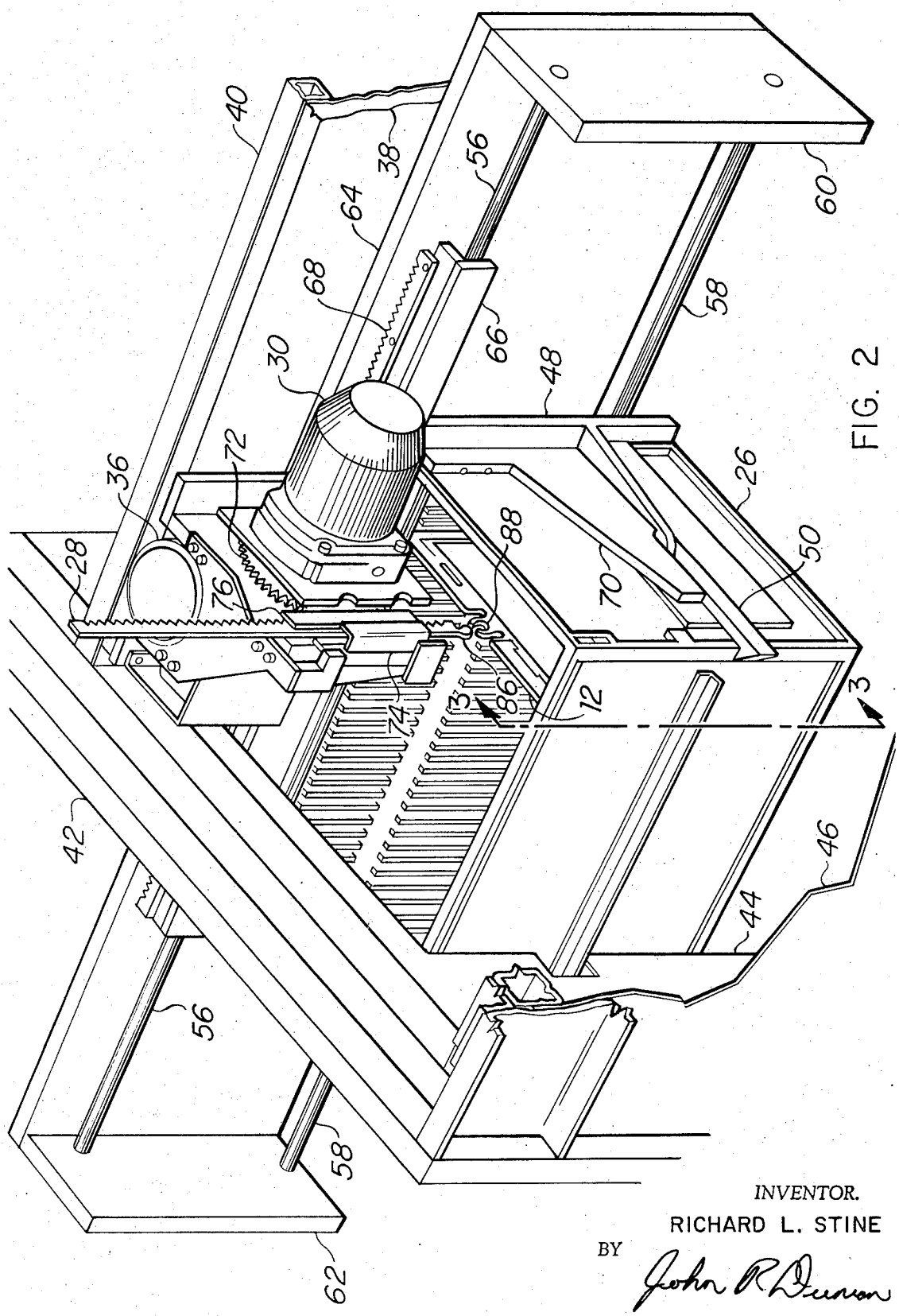
FIG. 2 is an isolated isometric view of the slide changing mechanism.

Further details of the invention, and a preferred embodiment thereof, will be made clear upon reference to FIG. 2, which shows an isometric view of the slide changing mechanism of this invention. While all essential components are shown in FIG. 2, some supporting structure and associated devices are not illustrated, for clarity. The structure shown is suitable for use in a system such as that schematically illustrated in FIG. 1, with the projection station directly below the magazine.

The slide changer is mounted on vertical plate 38 which also serves as a support for the optical projection system (not shown) located below the slide changer. Plate 38 is mounted on the main equipment frame 40. Frame 40 supports an end enclosure 42 which has an opening 44 through which the slide change projects. A panel 46 closes the front of the equipment.

Figure 3:
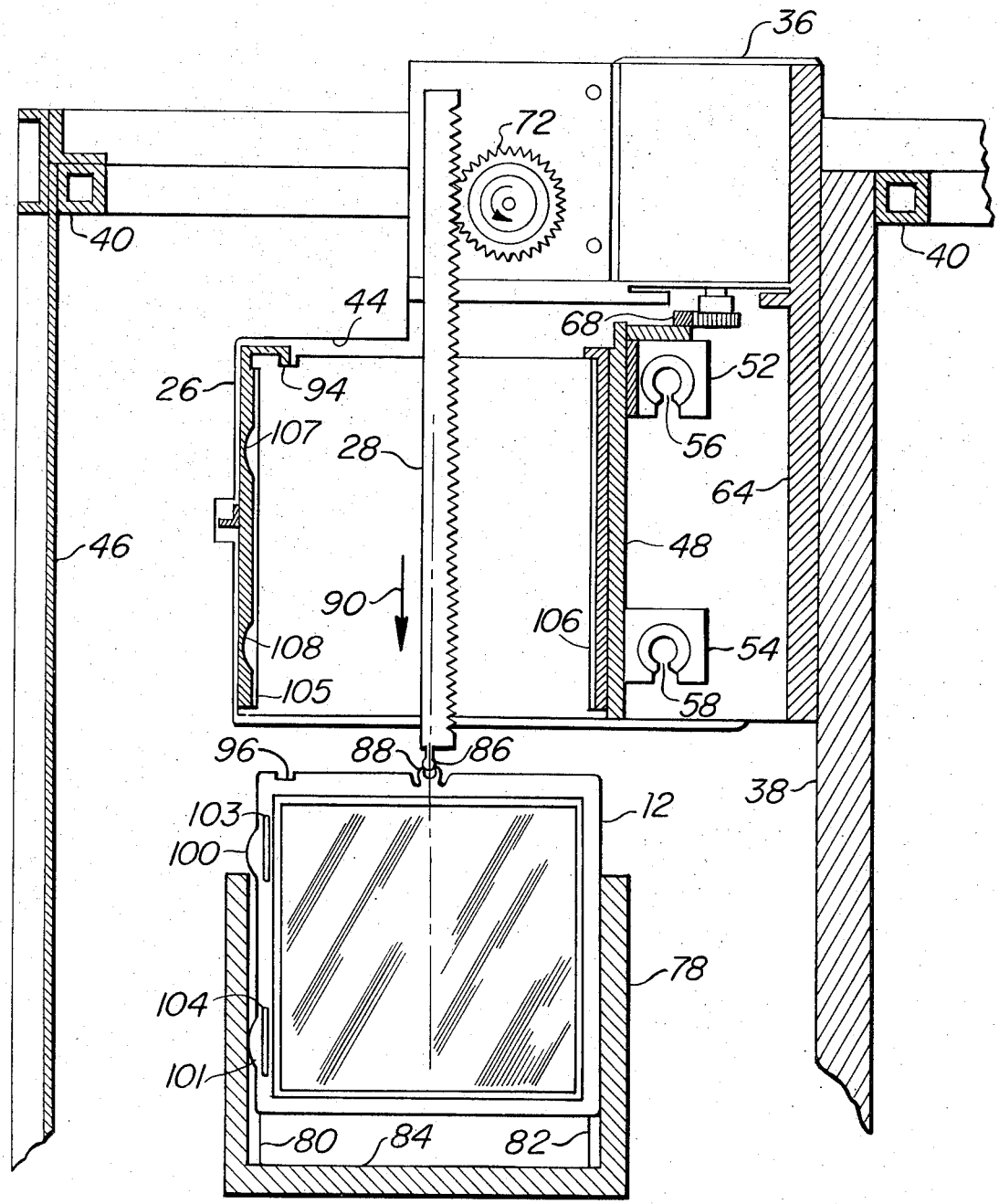
FIG. 3 is a transverse section through the slide changing mechanism taken along line 3—3 showing a slide moving into projection position.
Figure 4:
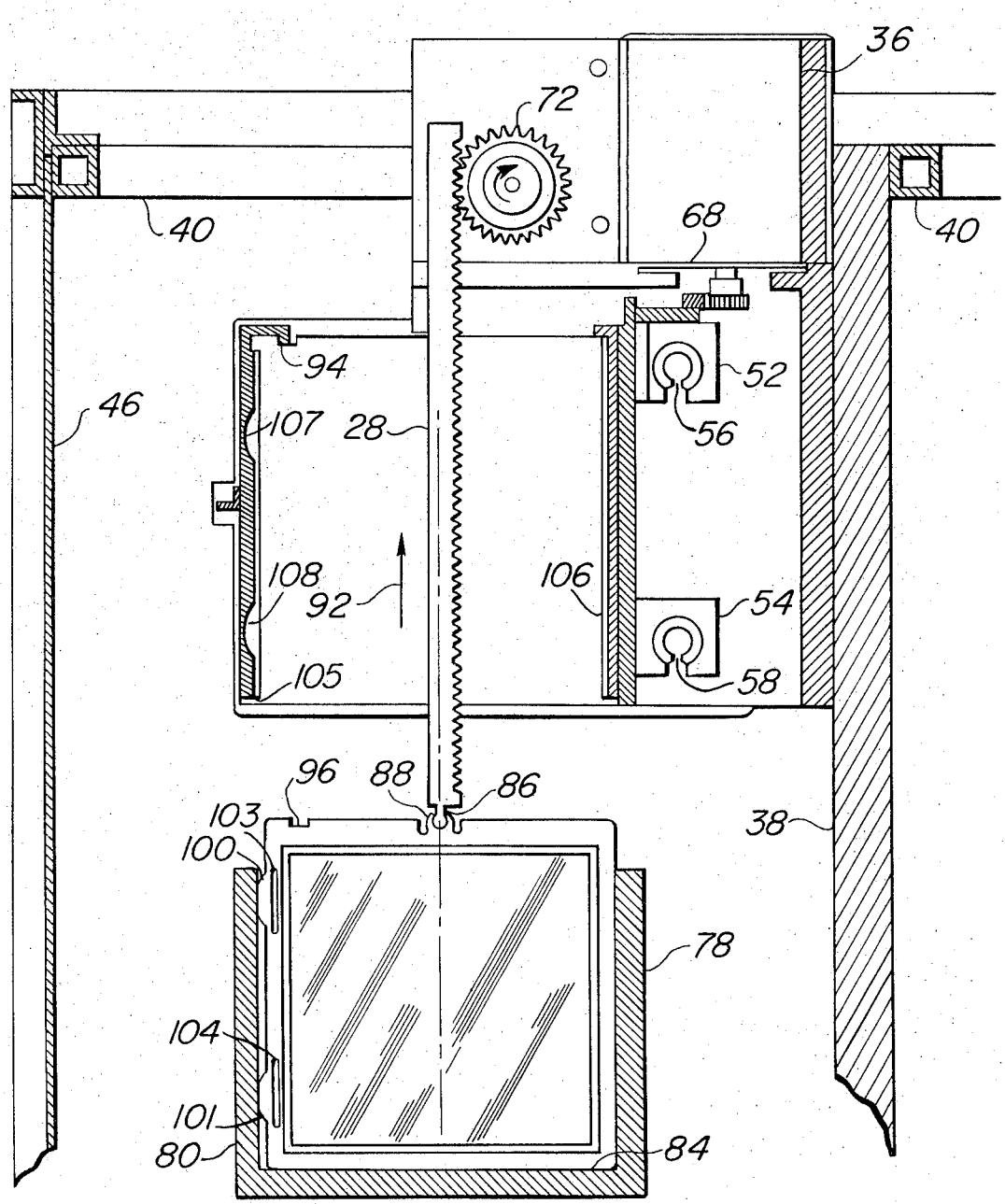
FIG. 4 is a transverse section through the slide changing mechanism taken along line 3—3 showing a slide in the projection position, about to be returned to the magazine.

A magazine 26, adapted to hold a plurality of slides 12, is held in contact with plate 48 by spring clips 50 at each end of magazine 26. Plate 48 is fastened to upper and lower guide sleeves 52 and 54 (as seen in FIGS. 3 and 4) which slidably engage upper and lower shafts 56 and 58, respectively. The ends of shafts 56 and 58 are secured to inner and outer mounting plates 60 and 62, which are fastened to backing plate 64 which is in turn secured to plate 38. Rack support member 66 is secured to plate 48 and the upper guide sleeve 52. Rack 68 is mounted on member 66 and meshes with a pinion gear (not shown) driven by motor 36. When motor 36 is activated the pinion drives rack 68 to move magazine 26 back and forth parallel to shafts 56 and 58.

Magazine 26 may be removed and replaced by moving the magazine 26 and support plate 48 toward plate 62 until the inner end of magazine 26 clears end enclosure 42, then moving spring clips 50 out of engagement with the magazine and sliding the magazine perpendicularly away from plate 48. Cooperating lands and grooves between the ends of magazine 26 and the inner surface of frame members 70 aid in supporting the magazine and in guiding it into and out of the mounted position.

Magazine 26 holds a plurality of slides 12. Only a single slide is shown in FIG. 2, for clarity. Each slide 12 is held in position by frictional engagement with grooves in the inner walls of magazine 26. This permits the slides to be pushed downwardly out of magazine 26 into a projection station (not shown) below magazine 26.

In use, a slide to be projected is located immediately below slide drive rack bar 28 by operating motor 36 to move magazine 26. Slide drive rack bar 28 engages a pinion gear 72 which is rotated by motor 30 to drive rack bar 28 upwardly or downwardly, as desired. Guide members 74 and 76 support rack 28 for vertical movement.

As best seen in FIG. 3, when rack bar 28 is driven downwardly, slide 12 is pushed down and out of magazine 26 and into projection station 78. Projection station 78 includes a pair of grooved guide members 80 and 82 which engage the edges of slide 12, and a registration stop 84 against which slide 12 is finally positioned. Guides 80 and 82 and stop 84 cooperate to very accurately position the slide for projection, so that the projected image is in very accurate registration with superimposed data.

Projection 86 on the lower end of rack bar 28 has a generally cylindrical cross-section. Projection 86 engages a generally cylindrical socket 88 on the upper edge of slide 12. Projection 86 "snaps" into socket 88 when pressed thereagainst with sufficient force. As slide 12 is pushed out as indicated by arrow 90 of magazine 26, the force is generally insufficient to cause the projection to snap into the socket. However, when slide 12 comes into contact with registration stop 84, the continued driving force of motor 30 will force projection 86 into socket 88. This will also insure that slide 12 is in good, exact, contact with stop 84 and, therefore, in proper projection position.

While in the embodiment shown in the drawing, the projection 86 is shown formed on the end of rack bar 28, and socket 88 is shown on the edge of slide 12, these positions could be reversed, if desired, with socket 88 on rack bar 28 and projection 86 on slide edge 12. Also, while the cylindrical projection and socket arrangement is preferred, since it allows for slight misalignment between rack bar 28 and slide 12 in a direction perpendicular to the plane of slide 12, any other suitable configuration may be used, if desired. Typically a round ball-and-socket arrangement could be used, if desired.

Any suitable means may be used to stop motor 30 during projection. For example, limit switches of the snap action micro-switch or of the photoelectric detector type may be used. Or, motor 30 may be connected to the respective pinion gear 72 through a slip clutch which permits the motor to run for a short time after the rack movement limiting stop has been reached, after which a timing means deactivates the motor. Such conventional movement limiting devices may be used to limit the vertical movement of rack bar 28 and the horizontal movement along rack 68, as desired.

As discussed above, it is very important that every slide be located in the same position in projection station 78 during projection so that the projected image will be in register with other images with which it is combined. Spring means are provided along one edge of the slide to assure proper registration.

Integral spring projections 100 and 101 are provided in the edge of slide frame 12. Elongated slots 103 and 104 are provided behind projection 100 and 101, respectively, to give the desired spring action. As the slide 12 enters groove 80, these springs will be slightly compressed. This force will keep the opposite edge of frame 12 in intimate contact with groove 80. While rounded projections 100 and 101 are illustrated, these may have flattened contact surfaces, if desired. While two projections are shown, any suitable number may be used. Although a straight edge is shown on slide frame 12 opposite the projections, a plurality of spaced rigid projections may be used to decrease frictional drag between the slide and groove 82 as the slide is moved into and out of projection station 78.

When slide frame 12 is returned to magazine 26, projections 100 and 101 enter groove 105 in magazine 26, and the opposite edge enters groove 106. It is preferred that detents or cavities 107 and 108 having shapes corresponding to projections 100 and 101 be provided in groove 105, so that the projections can drop into them when the slide is fully inserted into the magazine. This will help hold the slides in the magazine and will prevent excessive outward forces being imposed on the wall of magazine 26 should a number of slides be placed in the magazine. Without cavities 107 and 108, the projections on each of a number of slides would be pressing against the groove walls, which would cause bowing of the magazine wall.

When it is desired to change the slide in projection station 78 as shown in FIG. 4, motor 30 is operated in the reverse direction to move rack bar 28 upwardly. Projection 86 engaged in socket 88 lifts slide 12 back up into magazine 26 as indicated by arrow 92. When slide 12 is fully within the magazine, the slide encounters stop 94 at the upper end of the wall of magazine 26. As motor 30 continues to operate, projection 86 is "snapped" out of socket 88. Motor 36 is then operated to move magazine 26 until the desired slide is below projection 86. Motor 36 is stopped and the newly selected slide is pushed downwardly from magazine 26 to projection station 78 as described above.

Stop 94 on the wall of magazine 26 cooperates with a notch 96 in the top edge of slide 12 to assure that slides are loaded correctly into magazine 26. With this stop 94, if the slide is inserted in reverse, the unnotched edge will contact stop 94 and prevent full insertion of slide 12 into magazine 26. An operator can readily observe incorrectly inserted slides extending below the lower surface of magazine 26.

Other modifications and applications of the present invention will occur to those skilled in the art upon reading this disclosure. These are intended to be included within the scope of the invention, as defined in the appended claims.

I claim:

1. A slide changing system which comprises:

a. a slide magazine adapted to releasably hold a plurality of slides,
 b. a projection station adjacent to said magazine,
 c. magazine drive means to move said magazine to bring a selected one of said slides into alignment with said projection station,
 d. slide drive means to move said selected slide from said magazine to said projection station, said slide drive means comprises a bar lying in the plane of said selected slide, longitudinally movable into contact with an edge of said slide to push said slide out of said magazine into said projection station,
 e. releasable pressure latch means, a first part of which is mounted on the end of said bar which contacts said slide and the remaining part of which is mounted on said slide edge at the point of contact with said bar, the pressure exerted by said bar to move said slide toward said projection station being insufficient to latch said latch means,
 f. slide registration means in said projection station to prevent further movement of said slide when it reaches the desired projection position, the pressure of said bar against said slide when said slide is stopped being sufficient to actuate said latch means and releasably latch said bar to said slide,
 g. slide return means including means to longitudinally move said bar to move said slide back into said magazine, and
 h. disengagement means including means in said magazine to stop said slide movement when said slide has reached the desired position in said magazine and means to continue longitudinal movement of said bar to automatically disengage said releasable pressure latch means.

2. The slide changing system according to claim 1 wherein said releasable pressure latch means includes a projection of enlarged cross-section on said bar and a socket corresponding to said projection on said slide edge, in alignment with said projection whereby sufficient pressure of said bar against said slide edge will cause said projection to enter said socket and become releasably trapped therein.

3. The slide changing system according to claim 2 wherein said projection has a substantially cylindrical cross-section, with the centerline of said cylinder being substantially perpendicular to the plane of said slide, and said socket includes a bifurcated member extending toward said projection, and partially surrounding a space which is complementary to said projection.

4. The slide changing system according to claim 1 wherein said releasable pressure latch means includes a projection of enlarged cross-section on said slide edge and a socket corresponding to said projection on said bar, in alignment with said projection whereby sufficient pressure of said bar against said slide edge will cause said projection to enter said socket and become releasably trapped therein.

5. The slide changing system according to claim 4 wherein said projection has a substantially cylindrical cross-section, with the centerline of said cylinder being substantially perpendicular to the plane of said slide, and said socket includes a bifurcated member extending toward said projection, and partially surrounding a space which is complementary to said projection.

6. The slide changing system according to claim 1 wherein said slide drive means includes a rack portion on said bar in engagement with a pinion gear rotatable to move the bar in either longitudinal direction.

7. A slide changing system which comprises:
 a. a slide magazine adapted to releasably hold a plurality of slides in grooves in opposite magazine walls,
 b. a projection station adjacent to said magazine having first and second grooves in opposed walls into which a selected slide is movable,
 c. means to move a selected slide from said magazine into said grooves in said projection station, and
 d. at least one projection projecting outwardly from a first edge of said slide in the plane of said slide and substantially perpendicular to the line of slide movement between said magazine and said projection station; said projection adapted to slide in said first groove during said movement; and an elongated slot formed in the edge of said slide adjacent to said projection, said slot being substantially parallel to the edge of said slide; said slot having a length slightly longer than the length of said projection along the slide edge; whereby spring action results so that said projection may be deflected slightly toward said slide as said slide moves within said first and second grooves and the edge of said slide engaging said second groove is maintained in constant uniform contact with said second groove.

8. The slide changing system according to claim 7 wherein the grooves in said magazine include outwardly extending cavities corresponding to the shape and position of said projections when said slides are fully inserted in said magazine, whereby said slides are held in said magazine without outward pressure on the walls thereof.

* * * * *